Figure 1:
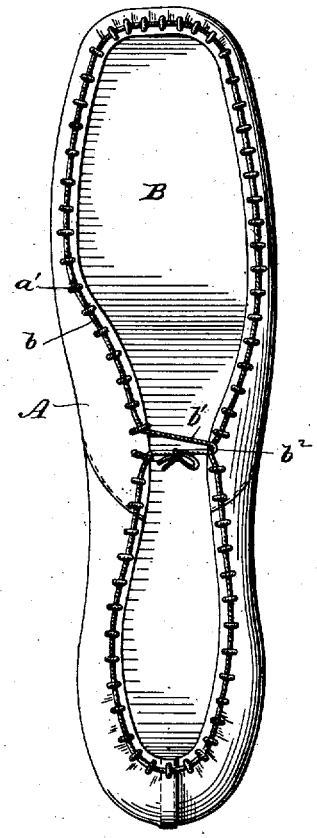

W. C. CROSS.

Assignor to the STANDARD BOOT AND SHOE LASTING COMPANY.

LASTING BOOTS OR SHOES.

No. 10,642. Reissued Sept. 1, 1885.

Witnesses:

N. N. Low

E. A. Sick

Inventor:

William C. Cross by Manuel Bailey his attorney

UNITED STATES PATENT OFFICE.

WILLIAM C. CROSS, OF BOSTON, MASSACHUSETTS, ASSIGNOR TO THE STANDARD BOOT AND SHOE LASTING COMPANY, OF PORTLAND, MAINE.

LASTING BOOTS OR SHOES.

SPECIFICATION forming part of Reissued Letters Patent No. 10,642, dated September 1, 1885.

Original No. 306,589, dated October 14, 1884. Application for reissue filed May 21, 1885.

*To all whom it may concern:*

Be it known that I, WILLIAM C. CROSS, of Boston, in the county of Suffolk and State of Massachusetts, have invented a certain new and useful Improvement in Lasting Boots and Shoes, of which the following is a specification.

It has been my object in this invention to provide a ready and convenient means for evenly drawing and gathering the edge of the upper over, upon, and around the last, and particularly the curved portions of the same, in the operation of lasting a boot or shoe. This result I obtain by combining with the upper a series of connected loops upon one face and around but back of the edge of the upper, and a draw-cord which passes through said loops, and is thereby held in place upon the face and back of the edge of said upper, and acts when drawn up by its ends to draw smoothly the edge of the upper over upon the bottom of the last, gathering it evenly at all points where this is needed.

I remark at the outset that I am aware that a lacing-cord passing from one side to the other of the upper across the bottom of the last has been employed for the purpose which I have in view. For the same purpose there has been proposed a modification of this plan, consisting, substantially, in sewing along the edge of the upper with a single thread, and interlacing the same with a lacing-cord going either entirely across from one side to the other of the last or to a center cord similarly sewed to and extending lengthwise of the insole. The edge of the upper has also been gathered in by a thread or string applied thereto by sewing "over and over" its edge. All of these plans, however, are defective in that they take too much time, are not efficient to gather evenly and to the requisite extent the edges of the upper around the curved portions of the last, and they permit the draw-string or its equivalent to be applied and put in place only after the upper is put on the last. Another plan is to provide the upper around its edge with a pocket or channel, formed either by the upper itself or its lining, or both, or by a separate folded strip of cloth stitched to the upper, and to insert in this pocket or channel a draw string or cord, by pulling on which the upper can at its edge be drawn over upon the last. My plan, while having many of the advantages of the one last referred to, possesses, in addition, features which are not found conjoined in any of which I have knowledge. The loops while connected together are separated by intervals, so as to permit those portions of the draw-cord extending between them to be got at, thus permitting said draw-cord to be taken hold of at any point where it is necessary to apply direct pull or strain. At the same time, inasmuch as the loops are back of the edge of the upper, the draw-cord is held upon the face and back of the edge of the upper, and in this position acts more efficiently during the drawing or gathering operation to hold the upper and to distribute the strain thereon. Again, the loops, owing to the fact that they are connected in series or formed out of a continuous cord, are capable during the drawing-in operation of varying slightly in length, so that some may shorten and others may lengthen to compensate for irregularities in the stitching or the cut of the upper. At the same time, however, they are practically locked in place in the sense that one cannot unduly elongate at the expense of the other. The loops, under my arrangement, also serve in effect to space the gathers at the heel and toe, the gathers coming in the spaces between the loops, and thus being distributed evenly and regularly around the curved portions, and they permit the cutting or slitting of the leather at the heel and toe, which is often necessary in lasting a heavy upper. Moreover, I can apply the cords to the upper very inexpensively and with great rapidity. All that is necessary is to run a line of stitching with a lock-stitch sewing-machine around the edge of the upper, so regulating the tension on the the two threads, respectively, that one of the threads, at the points where the two interlock, will be drawn through the upper. The thread thus drawn through will be the loop cord and the other will be the draw-cord, and without further preparation they are ready for use.

I desire it to be understood that in using the term "cord," as applied to the draw and loop cords, I intend a cord of any suitable material.

Figure 2:
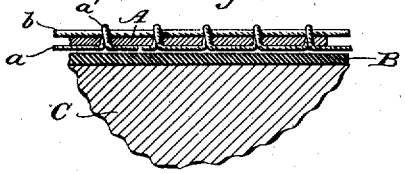

In the accompanying drawings, Figure 1 is a plan of the under face of a shoe lasted in accordance with my invention. Fig. 2 is a longitudinal section, on an enlarged scale, of a portion of the same through the line of loops.

A is the upper, B is the insole, and C is the last. The loop-cord is shown at *a* and the draw-cord at *b*. The loop cord, which extends around the edge of the upper, lies on the lining side of the upper, and at intervals throughout its length is passed through to the opposite face of the upper, thus forming on the latter face a series of projecting connected loops, *a'*, which extend around and bound the edge of the upper. Through these loops passes the draw-cord *b*, which by them is held in place along the edge of the upper. By drawing on the ends of the cord *b*, after the upper and insole are put on the last, the edge of the upper will be drawn in and gathered evenly over the last. In the particular arrangement represented in the drawings there is but one draw-cord for the whole upper. When employing this arrangement, I prefer to pass one of the ends *b'* of the cord around the draw-cord on the opposite side of the last, as indicated at $b^2$. Under these circumstances, by drawing on the ends of the cord the upper will be drawn in closely upon and caused to conform to the shank of the last.

I can, if I choose, employ a separate draw-cord for the heel and toe portions of the upper, and I do not desire to be understood as restricting myself to the employment of any specific number of draw-cords.

I have hereinbefore indicated that the loop and draw-cords can be readily applied to the upper by running a row of stitching around the edge of the upper with a lock-stitch machine. In such case, inasmuch as the draw-cord usually will be heavier or larger than the loop-cord, I prefer that the under or shuttle thread should constitute the draw-cord, since it is not required to pass through the upper, and I so regulate the tension on the two threads—putting a comparatively light tension on the upper or needle thread and a comparatively heavy tension on the under or shuttle thread—that in making the stitches the loops of needle-thread at the interlocking points will be drawn through to the side of the upper on which the under thread is, thus producing the arrangement of loop and draw cords represented in the drawings.

In conclusion, I state that I do not claim, broadly, the employment, in connection with a draw-cord, of a cord which extends around the edge of the upper in the form of a series of connected loops, through which the draw-cord is passed. A loop-cord of this kind is shown in Patent No. 104,828, dated June 28, 1870, and is not new with me. In said patented arrangement, however, the loops are formed by a cord sewed over and over the edge, so that each can freely draw upon the other, and also they are not upon the face of the upper, but they extend beyond the edge of the upper, so that the draw-cord cannot lie upon the face and back of the edge of the upper. Furthermore, in my arrangement the loop-cord is laid on the side of the upper opposite to that on which the draw-cord is laid, and at intervals is bent into loops whose bights extend through to the opposite side of the upper, where they meet the draw-cord. The edge of the upper is thus held between these two cords, which in this position can be most effectively applied to draw and gather smoothly the edge of the upper over upon the last and insole, and the arrangement is such that one loop may break without affecting the others, or thereby causing the loop-cord to pull out.

What I claim as new is—

1. A boot or shoe upper having a series of connected loops upon one face and around but back of the edge of the upper, and a draw-cord passing through said loops and held thereby upon the face of the upper back of the edge, substantially as and for the purposes hereinbefore set forth.

2. The combination, with a boot or shoe upper, of the draw-cord *b*, laid along the edge and upon one of the sides of the upper, and the loop-cord *a*, laid along the edge and upon the other side of the upper, and bent at intervals into loops *a'*, whose bights pass through to the opposite side of the upper and receive the draw-cord, as and for the purposes hereinbefore set forth.

In testimony whereof I have hereunto set my hand this 16th day of May, 1885.

WILLIAM C. CROSS.

Witnesses:
EWELL A. DICK,
J. WALTER BLANDFORD.